(12) United States Patent  
Essiambre et al.

(10) Patent No.: US 8,331,800 B2
(45) Date of Patent: *Dec. 11, 2012

(54) INTRA-CHANNEL NONLINEARITY COMPENSATION FOR OPTICAL DATA COMMUNICATIONS

(75) Inventors: Rene-Jean Essiambre, Red Bank, NJ (US); Chongjin Xie, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 338 days.

This patent is subject to a terminal disclaimer.

(21) Appl. No.: 12/652,784

(22) Filed: Jan. 6, 2010

(65) Prior Publication Data

US 2010/0111542 A1     May 6, 2010

Related U.S. Application Data

(63) Continuation of application No. 11/382,815, filed on May 11, 2006, now Pat. No. 7,672,599.

(51) Int. Cl.
*H04B 10/04* (2006.01)
*H04B 10/12* (2006.01)
*H04J 14/02* (2006.01)

(52) U.S. Cl. ............... 398/193; 398/81; 398/159
(58) Field of Classification Search .......... 398/81, 398/159, 193
See application file for complete search history.

(56) References Cited

U.S. PATENT DOCUMENTS

| | | | |
|---|---|---|---|
| 7,254,342 B2 * | 8/2007 | Odate et al. ............... 398/148 |
| 7,672,599 B2 * | 3/2010 | Essiambre et al. ............ 398/193 |
| 2006/0024062 A1 * | 2/2006 | Jakober et al. ................ 398/141 |

* cited by examiner

*Primary Examiner* — Nathan Curs
(74) *Attorney, Agent, or Firm* — D. M. La Bruno

(57) ABSTRACT

An arrangement is described for compensating intra-channel nonlinearities in an optical communications system which combines optical dispersion compensation with electronic pre-distortion (EPD). EPD with moderate lookup table size can effectively suppress intra-channel nonlinearities over optical transmission links incorporating optical dispersion compensation. The arrangement can be implemented for a variety of optical communications systems, including 10 Gb/s, 40 Gb/s and higher bit rate systems as well as single-channel and wavelength-division multiplexing (WDM) systems.

18 Claims, 5 Drawing Sheets

INTRA-CHANNEL NONLINEARITY COMPENSATION FOR OPTICAL DATA COMMUNICATIONS

RELATED APPLICATION

This application is a continuing application of application Ser. No. 11/382,815 filed May 11, 2006 now U.S. Pat. No. 7,672,599.

FIELD OF THE INVENTION

The present invention relates to the field of high-speed optical communications, and more specifically to methods and apparatus for effecting intra-channel nonlinearity compensation.

BACKGROUND INFORMATION

The use of electronic pre-distortion (EPD) to compensate chromatic dispersion was proposed as early as two decades ago. (T. L. Koch et al., JLT, vol. 3, 1985, pp. 800-805.) Thanks to progress in high-speed electronic digital signal processing, there has recently been a revived interest in this technique for 10 Gb/s systems. The aim of more recent studies of this technique has been to entirely eliminate inline optical dispersion compensators (ODCs) by compensating chromatic dispersion at the transmitters. (See, e.g., M. M. El Said et al, JLT, vol. 23, 2005, pp. 388-400; D. McGhan et al, OFC'05, paper PDP27; R. I. Killey et al, IEEE PTL, vol 17, 2005, pp. 714-716.)

Due to large temporal power variations in such systems and the absence of nonlinearity compensation through dispersion mapping, nonlinearities in EPD systems are much larger than systems using ODCs. (See R. J. Essiambre et al, OFC'06, paper OWB1; R. J. Essiambre et al, ECOC'05, paper Tu3.2.2.)

Although EPD has the ability, in principle, to compensate self-phase modulation (SPM), inter-channel cross-phase modulation (XPM) greatly impacts EPD systems, especially systems operating at 10 Gb/s. Moreover, operation of EPD at 40 Gb/s increases transmitter complexity considerably due to an increase by a factor of 16 in bit overlap. Alternatively, multi-level modulation formats with advanced receivers have been required when implementing EPD at 40 Gb/s. (P. J. Winzer et al, ECOC'05, paper Tu4.2.2.)

SUMMARY OF THE INVENTION

The present invention is directed to a system and method of compensating intra-channel nonlinearities in an optical communications system which includes optical dispersion compensation and electronic pre-distortion. The present invention can be implemented in a variety of systems, including 10 Gb/s, 40 Gb/s and higher bit rate systems, as well as single-channel and wavelength-division multiplexing (WDM) systems.

DETAILED DESCRIPTION

Figure 1:
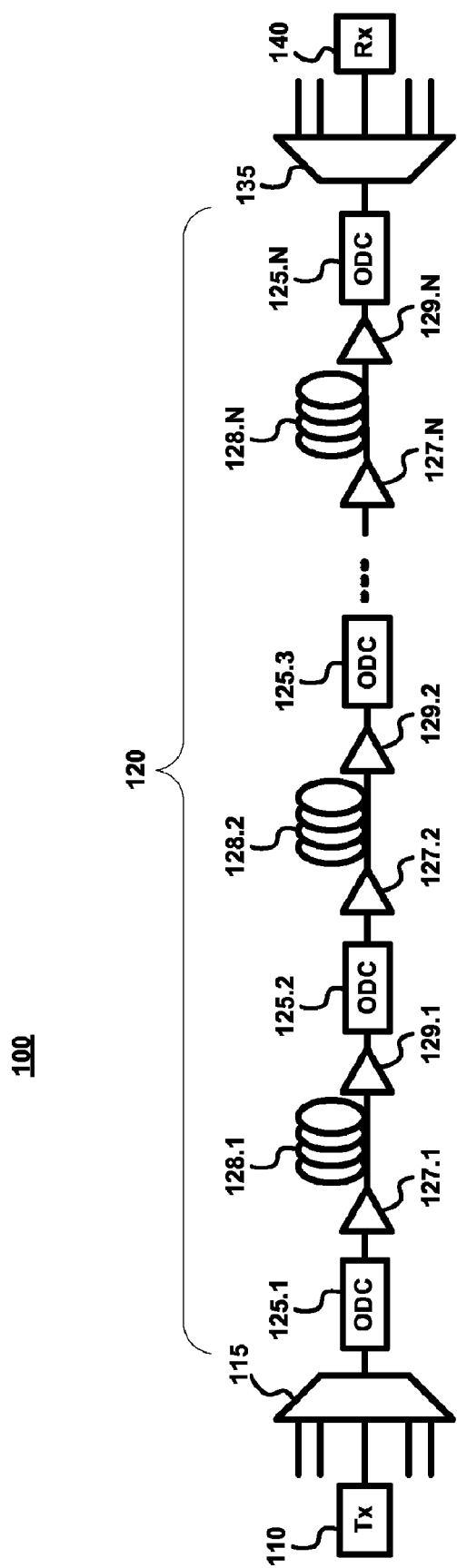
FIG. 1 is a schematic representation of an exemplary embodiment of a system in accordance with the present invention.

FIG. 1 is a schematic representation of an exemplary embodiment of an optical communications system 100 in accordance with the present invention. The system 100 includes a transmitter 110 which may be coupled via an optional multiplexer 115 to an optical link 120 comprised of several sections of optical fiber and related components, as described more fully below. The optical link 120 is ultimately coupled to a receiver 140, such as via an optional demultiplexer 135.

An electrical input data signal is provided to the transmitter 110, which processes and converts the electrical signal into an optical signal for transmission over the optical link 120 to the receiver 140. The optical signal is then processed and converted at the receiver 140 back into an electrical data signal.

In accordance with the present invention, electronic pre-distortion (EPD) is performed at the transmitter 110 as described more fully below. Additionally, the optical link 120 includes optical dispersion compensators (ODCs).

The optical link 120 includes multiple ODCs 125.1-125.N which are preferably distributed along the length of the optical link. As shown in FIG. 1, the ODCs 125.1-125.N are arranged between sections of optical fiber 128.1-128.N. In the exemplary embodiment shown, optical amplifiers 127.1-127.N and 129.1-129.N are arranged at either end of each corresponding section of fiber 128.1-128.N to compensate the losses in the fiber and the ODCs.

The ODCs 125.1-125.N and the optical amplifiers 127.1-127.N can each be implemented conventionally.

In addition to the electronic pre-distortion that is carried out at the transmitter, there are several electronic processing techniques that may be applied at the receiver, in accordance with an exemplary embodiment of the present invention. Such techniques, may include, for example, maximum likelihood sequence estimation (MLSE), Feed-Forward Equalization (FFE), or Decision-Feedback Equalizer (DFE), among others.

Figure 2A:
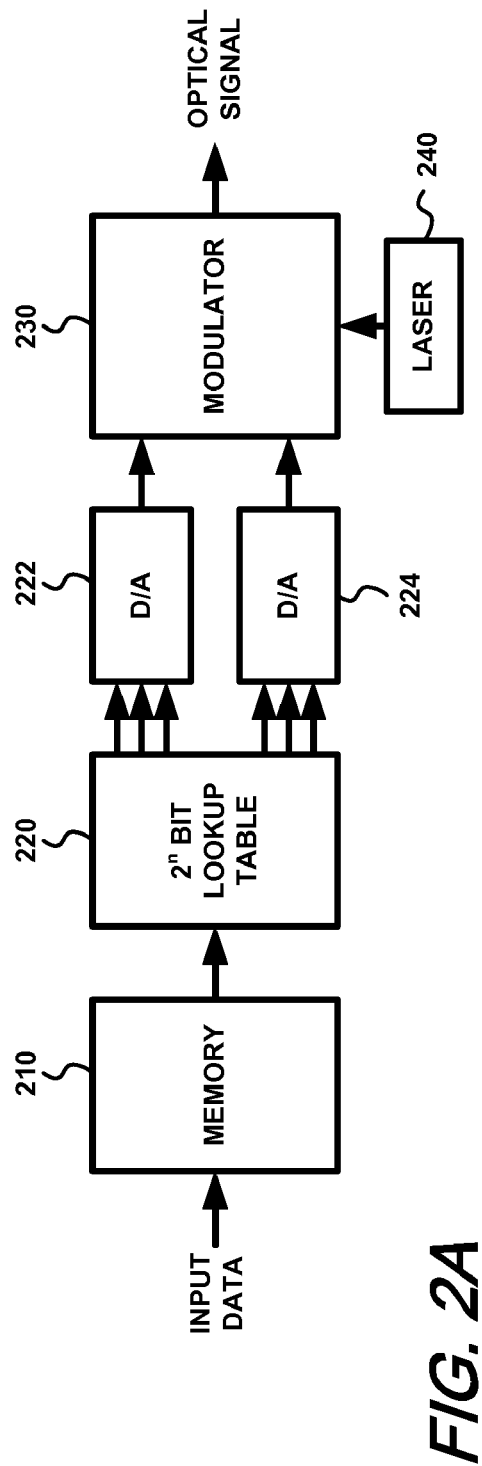
FIGS. 2A and 2B are block diagrams of exemplary transmitters employing electronic pre-distortion (EPD).
Figure 2B:
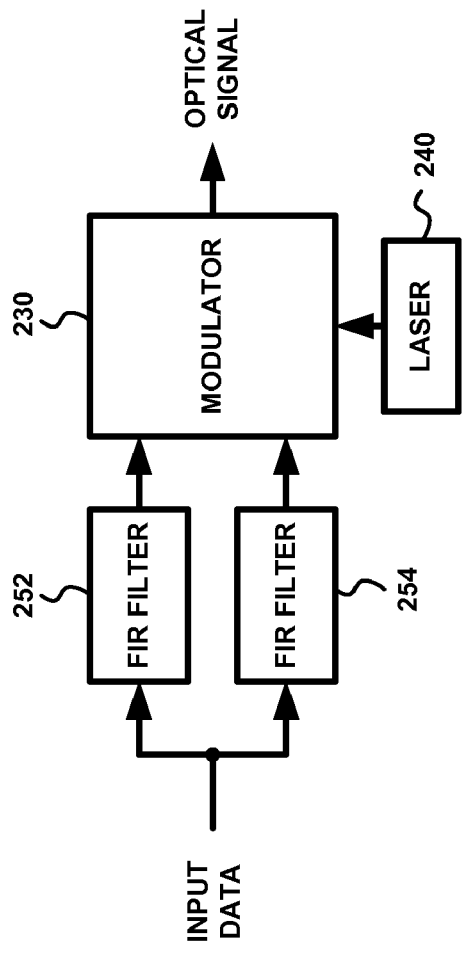

FIGS. 2A and 2B are block diagrams of exemplary embodiments of a transmitter incorporating EPD for use in a system in accordance with the present invention. The transmitter embodiments of FIGS. 2A and 2B are known and can be implemented conventionally as described below.

In the embodiment of FIG. 2A, data to be transmitted is provided to a memory 210. The output of the memory 210 is provided to a look-up table 220. The output of the lookup table 220 is provided to digital-to-analog (D/A) converters 222 and 224. The outputs of the D/A converters 222 and 224 are provided to a modulator 230 which modulates the output of a laser 240 in accordance with the D/A converter outputs to generate a pre-distorted output optical signal for transmission over the optical link. The modulator 230 may be, for example, an in-phase and quadrature (I/Q) modulator or a magnitude/phase modulator.

In the embodiment of FIG. 2B, the data to be transmitted is provided to finite-impulse-response (FIR) filters 252 and 254.

The outputs of the filters 252 and 254 are provided to the modulator 230 which modulates the output of a laser 240 in accordance with the filter outputs to generate a pre-distorted output optical signal for transmission over the optical link.

Simulations were performed to investigate the performance of an exemplary system in accordance with the present invention. In the simulations, the optical transmission link consisted of 20 spans of 100 km TRUEWAVE fiber with chromatic dispersion of 6.0 ps/(km.nm), nonlinear coefficient of 1.7 km$^{-1}$W$^{-1}$ and loss coefficient of 0.21 dB/km. After each span, the chromatic dispersion in the transmission fiber was compensated by dispersion compensation fiber (DCF), resulting in residual dispersion per span (RDPS) of 20 ps/nm. All-Raman amplification was used with 22/78 forward/backward pumping gain (in dB) in the transmission fiber and all backward pumping in the DCF. The nonlinearity in DCF was neglected in the simulations. Both transmission fiber and DCF were pumped at transparency. Pre-compensation of −400 ps/nm was employed, the numerically determined optimum value for the exemplary system simulated. The optical dispersion compensation was first optimized at each launch power for the ODC-only system, and was set to have 70 ps/nm net residual dispersion for the system with EPD, the optimum value at large launch powers for the ODC-only system.

The transmitter generated a 42.7-Gb/s, $2^9$ De Bruijn bit sequence (DBBS) non-return-to-zero (NRZ) pre-distorted signal. The transmitter was assumed to be of the embodiment shown in FIG. 2A in which the lookup table outputs an m-bit word to each D/A converter according to each n-bit input sequence, and the outputs of the two D/A converters drive the I/Q modulator to generate an ideal pre-distorted optical field. The simulations did not include the degradations caused by finite over-sampling and D/A converter resolution.

A lookup table was generated using backward propagation for different launch powers, then the pre-distorted optical signal at the transmitter was obtained from the lookup table according to the n-bit input sequence. A 50-GHz Gaussian filter was used to smooth the signal in the lookup table. The receiver used in the simulations had an 85-GHz bandwidth $4^{th}$-order super-Gaussian optical filter and a 5th-order Bessel electrical filter with a 3 dB bandwidth of approximately 32 GHz. Noise was neglected in the simulations. The eye-opening penalty of the systems was studied.

A single-channel transmission system was simulated first. FIGS. 3A-3D show the eye-opening diagrams of the transmission system at 2000 km without (FIG. 3A) and with EPD with various lookup table sizes with n=9, 11 and 13 (FIGS. 3B-3D, respectively). The launch power was set at −1 dBm.

Figure 3A:
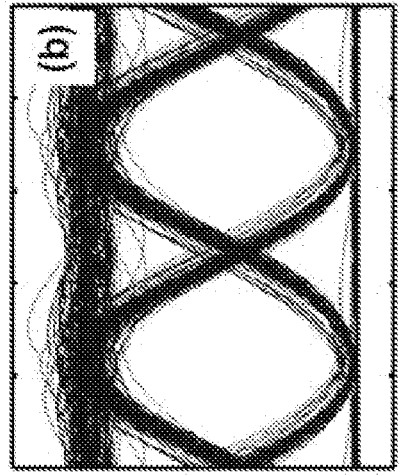
FIGS. 3A through 3D are signal eye-diagrams illustrating the performance of various embodiments of a system in accordance with the present invention.
Figure 3B:
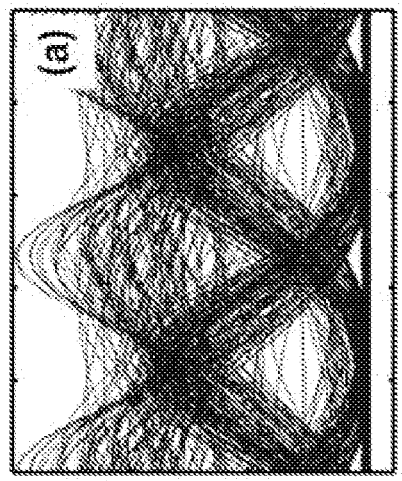
Figure 3C:
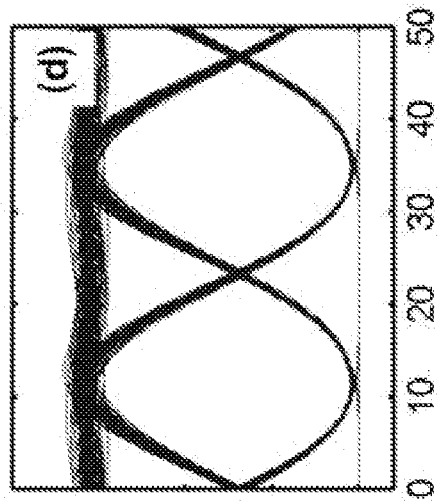
Figure 3D:
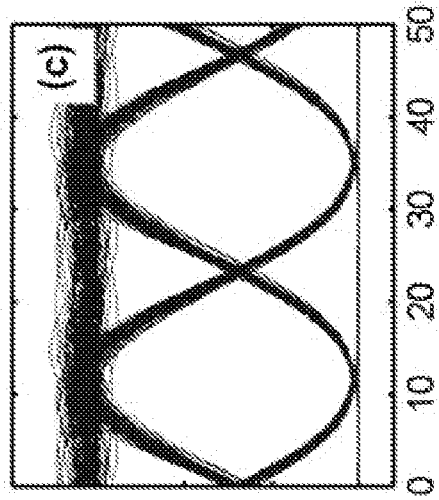

As shown in FIG. 3A, for the ODC-only system, the eye-diagram is completely closed at the simulated distance and launch power, whereas with the use of EPD, the eye-diagrams are open, with the eye-diagrams improving with larger lookup tables. With a lookup table having n=13 bit addressing, there is little distortion in the eye-diagram (FIG. 3D). It should be noted that the maximum chromatic dispersion that the signal experiences after 2000 km in the exemplary system simulated is approximately 600 ps/nm, which causes a pulse to spread to about 15 bits.

Figure 4:
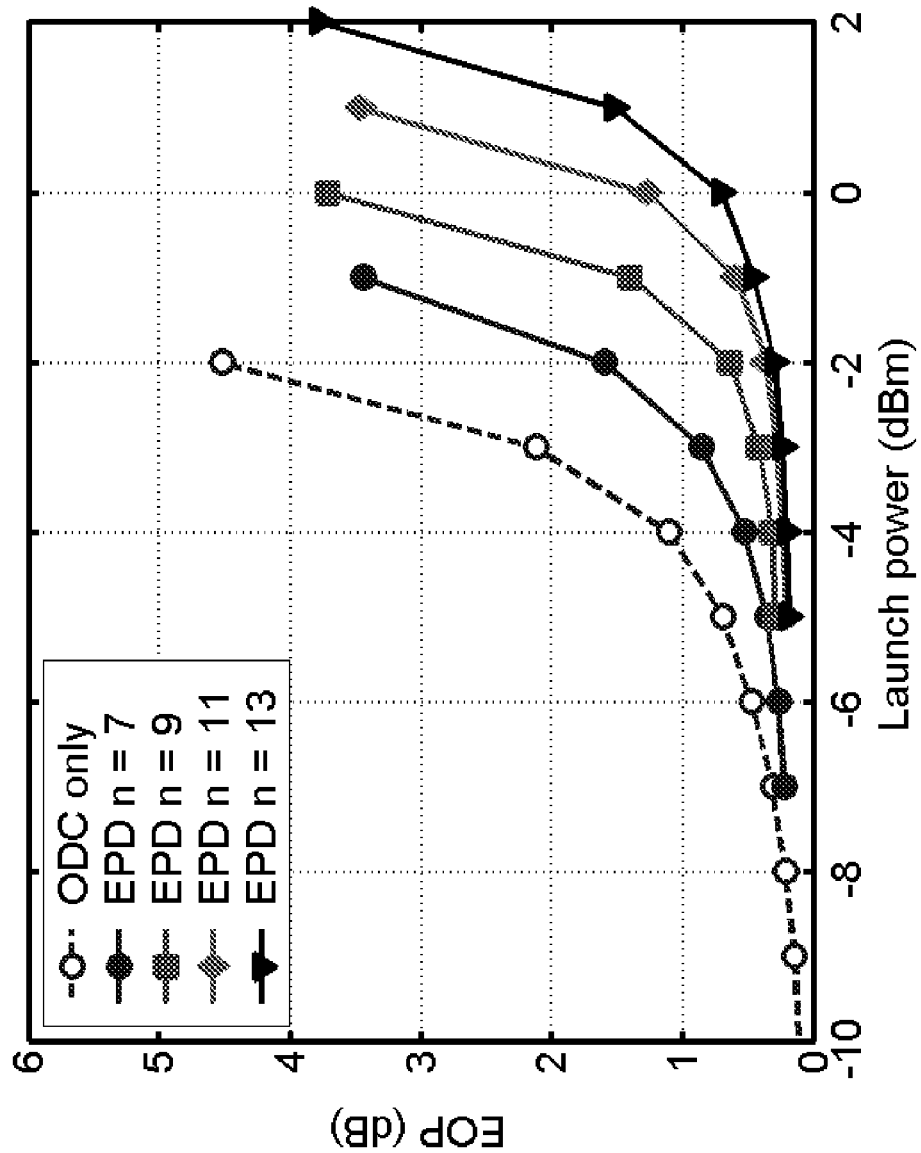
FIG. 4 is a graph of eye-opening penalty (EOP) plotted against launch power for various embodiments of a single-channel system in accordance with the present invention.

FIG. 4 plots the eye-opening penalty (EOP) versus the launch power for the single channel 40-Gb/s system without EPD and with EPD of different size lookup tables. EOP is defined as the ratio (in dB) of the back-to-back eye-opening to the eye-opening after transmission. The eye-opening is defined as the height of the highest rectangle with a 20% bit period width that can fit into the eye-diagram.

The results indicate that due to the suppression of intra-channel nonlinearities, the system with EPD can have a larger launch power. Furthermore, increasing the lookup table size increases the launch power for a given EOP. At an EOP of 1 dB, the launch power is limited to approximately −4.0 dBm for the ODC-only system. When EPD with n=7 to n=13 lookup tables is applied, the launch power can be increased approximately by 1 to 5 dB.

Figure 5:
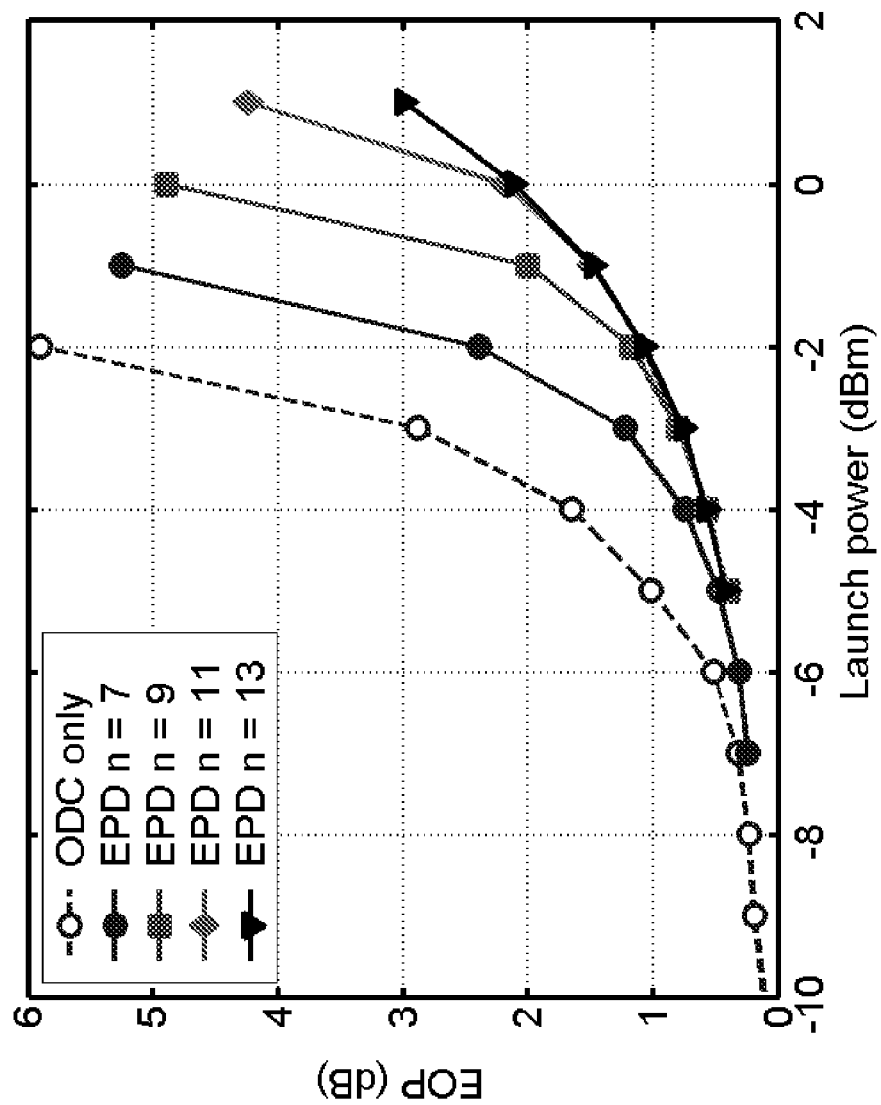
FIG. 5 is a graph of eye-opening penalty (EOP) plotted against launch power for various embodiments of a wavelength-division multiplexing (WDM) system in accordance with the present invention.

FIG. 5 plots the EOP of the center channel for a 9-channel 40-Gb/s WDM system with 100 GHz channel spacing. In the WDM system, the multiplexer and demultiplexer filter bandwidths are 85 GHz. Comparison between FIGS. 4 and 5 shows that the inter-channel XPM effect becomes dominant when the intra-channel nonlinearities are suppressed. As the inter-channel XPM effect increases with launch power, it becomes the ultimate limit for system performance. For EOP up to 2 dB, there is almost no difference between the WDM EPD system with n=11 and n=13 lookup tables, as the degradation is mainly induced by inter-channel XPM, which cannot be suppressed by EPD. At 1 dB EOP, the launch power of the WDM system can be increased by 3 dB.

Although EPD with lookup table addressing size (n) of 7 to 13 have been simulated, the present invention can be implemented with a wide range of lookup tables sizes (e.g., 5 to 30) and is not limited to any particular size or range of sizes.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. An intra-channel nonlinearity compensation apparatus for an optical data communications system comprising:
   electronic pre-distortion means for pre-distorting an electrical signal transmitted as an optical signal via an optical transmission link of the optical data communications system, the electronic pre-distortion means providing compensation for intra-channel nonlinearities associated with the optical transmission link, wherein the electronic pre-distortion means includes a lookup table generated using backward propagation for a plurality of launch powers; and
   optical dispersion compensation means for dispersion compensating the optical signal, wherein the optical dispersion compensation means includes a plurality of optical dispersion compensators distributed along the optical transmission link of the optical data communications system.

2. The apparatus of claim 1, wherein the electronic pre-distortion means is located at a transmitter.

3. The apparatus of claim 1, wherein the lookup table has a size n in a range of 5 to 30.

4. The apparatus of claim 1, wherein the optical data communications system is a wavelength-division multiplexing (WDM) system.

5. The apparatus of claim 1 comprising:
   electronic signal processing means, wherein the optical signal is converted to a received electrical signal which is processed by the electronic signal processing means.

6. The apparatus of claim 5, wherein the electronic signal processing means perform at least one of a maximum likelihood sequence estimation (MLSE), a feed-forward equalization (FFE), and a decision-feedback equalization (DFE).

7. A method for compensating intra-channel nonlinearity in an optical data communications system comprising:
   electronically pre-distorting an electrical signal transmitted as an optical signal via an optical transmission link of the optical data communications system to compensate for intra-channel nonlinearities associated with the optical transmission link, wherein electronically pre-distorting the transmitted signal includes using a lookup table generated using backward propagation for a plurality of launch powers; and optically dispersion compensating the optical signal, wherein the transmitted signal is optically dispersion compensated by a plurality of optical dispersion compensators distributed along the optical transmission link of the optical data communications system.

8. The method of claim 7, wherein the transmitted signal is electronically pre-distorted at a transmitter.

9. The method of claim 7, wherein electronically pre-distorting the transmitted signal includes using a lookup table having an addressing size n in a range of 5 to 30.

10. The method of claim 7, wherein the optical data communications system is a wavelength-division multiplexing (WDM) system.

11. The method of claim 7 comprising:
converting the optical signal into a received electrical signal; and
electronically signal processing the received electrical signal.

12. The method of claim 11, wherein electronically signal processing the received electrical signal includes performing at least one of a maximum likelihood sequence estimation (MLSE), a feed-forward equalization (FFE), and a decision-feedback equalization (DFE).

13. An intra-channel nonlinearity compensation apparatus for an optical data communications system comprising:
electronic pre-distortion compensator for pre-distorting an electrical signal for transmission as an optical signal via an optical transmission link of the optical data communications system, the electronic pre-distortion compensator providing compensation for intra-channel nonlinearities associated with the optical transmission link, wherein the electronic pre-distortion compensator includes a lookup table generated using backward propagation for a plurality of launch powers; and
a plurality of optical dispersion compensators for dispersion compensating the optical signal, wherein the plurality of optical dispersion compensators are distributed along the optical transmission link of the optical data communications system.

14. The apparatus of claim 13, wherein the electronic pre-distortion compensator is located at a transmitter.

15. The apparatus of claim 13, wherein the lookup table has a size between 7 and 13.

16. The apparatus of claim 13, wherein the optical data communications system is a wavelength-division multiplexing (WDM) system.

17. The apparatus of claim 13 further comprising:
electronic signal processor, wherein the optical signal is converted to a received electrical signal which is processed by the electronic signal processor.

18. The apparatus of claim 17, wherein the electronic signal processor performs at least one of a maximum likelihood sequence estimation (MLSE), a feed-forward equalization (FFE), and a decision-feedback equalization (DFE).

\* \* \* \* \*